(12) United States Patent
Wang et al.

(10) Patent No.: US 9,824,071 B2
(45) Date of Patent: Nov. 21, 2017

(54) VIEWING MESSAGES AND MESSAGE ATTACHMENTS IN DIFFERENT LANGUAGES

(75) Inventors: Chih-Chung Wang, Taipei (TW); Sheng-Yao Shih, Taipei (TW); Yu-Li Huang, Taipei (TW); Hsiang-Fu Liu, Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 12/326,901

(22) Filed: Dec. 3, 2008

(65) Prior Publication Data

US 2010/0138212 A1   Jun. 3, 2010

(51) Int. Cl.
G06F 17/28 (2006.01)
G06F 3/0481 (2013.01)
G06F 3/0484 (2013.01)
G06F 17/22 (2006.01)

(52) U.S. Cl.
CPC ................................. *G06F 17/2223* (2013.01)

(58) Field of Classification Search
CPC .... G06F 17/28; G06F 17/289; G06F 17/2223; G06F 3/0481; G06F 3/0484
USPC ................. 704/2, 3, 7, 8, 277; 715/264, 265
See application file for complete search history.

(56) References Cited

U.S. PATENT DOCUMENTS

| | | | |
|---|---|---|---|
| 5,884,246 A * | 3/1999 | Boucher et al. ................... | 704/2 |
| 6,393,445 B1 | 5/2002 | Chien | |
| 6,493,003 B1 * | 12/2002 | Martinez ............... | G06F 3/0481 |
| | | | 715/733 |
| 6,697,777 B1 * | 2/2004 | Ho et al. ........................ | 704/235 |
| 6,804,705 B2 * | 10/2004 | Greco et al. ................... | 709/219 |
| 6,924,827 B1 * | 8/2005 | Gulati et al. .................. | 715/763 |
| 7,243,298 B2 * | 7/2007 | Yozell-Epstein et al. ..... | 715/273 |
| 7,345,955 B1 * | 3/2008 | Campbell ....................... | 368/10 |

(Continued)

FOREIGN PATENT DOCUMENTS

| | | |
|---|---|---|
| CN | 1399208 A | 2/2003 |
| CN | 1755680 A | 4/2006 |

(Continued)

OTHER PUBLICATIONS

International Search Report from International Application No. PCT/US2009/062972, 12 pages, mailed May 20, 2010.

(Continued)

*Primary Examiner* — Martin Lerner

(57) ABSTRACT

Architecture that facilitates language conversion and previewing of a message attachment in multiple different languages. The architecture can be employed in a messaging application or a personal information manager program, for example, such that the message attachment can be selected and designated for conversion into a different language, and then previewed in the different language. For example, a first language can be simplified Chinese and a second language can be traditional Chinese, such that the user can toggle the preview to view the attachment in the simplified or traditional Chinese languages. The attachment can be a word processing document, a spreadsheet document, a presentation document for the presentation of information, and/or a web feed document. Additionally, the attachment can be one of multiple attachments to the message that is selected by the user.

18 Claims, 11 Drawing Sheets

(56) References Cited

U.S. PATENT DOCUMENTS

| | | | |
|---|---|---|---|
| 7,359,861 B2* | 4/2008 | Lee | 704/277 |
| 7,478,329 B2* | 1/2009 | Stevens | G06F 3/0484 715/734 |
| 7,584,216 B2* | 9/2009 | Travieso et al. | 707/104.1 |
| 8,041,018 B2* | 10/2011 | Wald et al. | 379/202.01 |
| 8,433,709 B2* | 4/2013 | Child | 707/737 |
| 8,473,276 B2* | 6/2013 | Qian et al. | 704/2 |
| 2002/0116172 A1 | 8/2002 | Vargas | |
| 2002/0120680 A1* | 8/2002 | Greco et al. | 709/203 |
| 2002/0188670 A1* | 12/2002 | Stringham | 709/203 |
| 2003/0146939 A1* | 8/2003 | Petropoulos et al. | 345/810 |
| 2004/0167784 A1 | 8/2004 | Travieso et al. | |
| 2004/0205674 A1* | 10/2004 | Delgado et al. | 715/536 |
| 2004/0230912 A1* | 11/2004 | Clow et al. | 715/773 |
| 2005/0010392 A1 | 1/2005 | Chen et al. | |
| 2005/0144243 A1 | 6/2005 | Cheng | |
| 2005/0172018 A1* | 8/2005 | Devine et al. | 709/223 |
| 2006/0095424 A1* | 5/2006 | Petropoulos et al. | 707/3 |
| 2006/0178866 A1* | 8/2006 | Chiu et al. | 704/2 |
| 2006/0184352 A1* | 8/2006 | Chen et al. | 704/2 |
| 2007/0011258 A1* | 1/2007 | Khoo | 709/206 |
| 2007/0038712 A1* | 2/2007 | Affronti et al. | 709/206 |
| 2007/0124675 A1* | 5/2007 | Ban et al. | 715/703 |
| 2007/0130563 A1* | 6/2007 | Elgazzar et al. | 717/137 |
| 2007/0169168 A1* | 7/2007 | Lim | 726/1 |
| 2008/0043976 A1* | 2/2008 | Maximo et al. | 379/220.01 |
| 2008/0046231 A1 | 2/2008 | Laden et al. | |
| 2008/0065580 A1* | 3/2008 | Spence et al. | 706/62 |
| 2008/0098073 A1* | 4/2008 | Coleman et al. | 709/206 |
| 2008/0288241 A1* | 11/2008 | Noda | 704/4 |
| 2009/0158137 A1* | 6/2009 | Ittycheriah et al. | 715/234 |
| 2009/0234633 A1* | 9/2009 | Chao-Suren et al. | 704/2 |
| 2010/0049752 A1* | 2/2010 | Chiu et al. | 707/204 |

FOREIGN PATENT DOCUMENTS

| | | |
|---|---|---|
| CN | 1894685 A | 1/2007 |
| CN | 101131690 A | 2/2008 |
| JP | 2001-318919 A | 11/2001 |
| JP | 2002073514 A | 3/2002 |
| JP | 2005-284334 A | 10/2005 |
| JP | 2006505843 A | 2/2006 |
| JP | 2006-107443 A | 4/2006 |
| JP | 2008-052720 A | 3/2008 |
| JP | 2008-171144 A | 7/2008 |
| KR | 10-2006-0048673 A | 5/2006 |
| TW | 498224 A | 8/2002 |

OTHER PUBLICATIONS

"Notice on the First China Office Action", Mailed Date: Jan. 31, 2013, Application No. 200980149046.7 Filed Date: Dec. 3, 2008, pp. 10.

"Notice on the Second China Office Action", Mailed Date: Sep. 23, 2013, Application No. 200980149046.7 Filed Date: Dec. 3, 2008, pp. 14.

Abstract of China Publication No. CN1399208A, published Feb. 26, 2003, 1 page.

"Convert Traditional Chinese to Simplified Chinese and Vice Versa" Retrieved at<<http://office.microsoft.com/en-us/word/HP052727391033.aspx>>, Sep. 25, 2008, pp. 1-2.

"STGuru Standard Edition 2.7a" Retrieved at<<http://stguru-standard-edition.anasoft-studio.qarchive.org/>>, Sep. 25, 2008, pp. 1-3.

"KEY Quick Reference" Retrieved at<<http://www.cjkware.com/quick_key.htm>>, Sep. 25, 2008, pp. 1-5.

"Word" Retrieved at<<http://www.ouhk.edu.hk/WCM/?FUELAP_TEMPLATENAME=tcSingPage&ITEMID=CCITUCONTENT_10504287>>, Sep. 25, 2008, pp. 1-5.

"Sending and Receiving Chinese & Japanese E-Mail under Microsoft Windows" Retrieved at<<http://newton.uor.edu/Departments&Programs/AsianStudiesDept/Language/email.html>>, Sep. 25, 2008, pp. 1-3.

"MLEditor Standard Edition 1.6.1" Retrieved at<<http://www.softlistnet/program/mleditor_standard_edition-software.html>>, Sep. 25, 2008, pp. 1-2.

"Third Office Action Issued in Chinese Patent Application No. 200980149046.7", dated Mar. 31, 2014, Filed Date: Nov. 2, 2009, 15 Pages.

"Notice of Rejection Issued in Japanese Patent Application No. 2011-539544", dated Sep. 17, 2013, Filed Date: Nov. 2, 2009, 6 Pages.

"Toshiba—Reliable Translation Software V1.0", Published by Softbank Publishing Co., Ltd., Printed in PC USER, vol. 7, Issue 21, Dec. 1, 2000, p. 203.

"E Frontier—ACDSee 9 Photo Manager", Published by Softbank Creative Co., Ltd., Printed in PC Japan, vol. 12, Issue 6, May 17, 2007, p. 176.

"Fourth Office Action Issued in Chinese Patent Application No. 200980149046.7", dated Sep. 25, 2014, Application Filing Date: Nov. 2, 2009 9 Pages.

"Office Action Received for Japan Patent Application No. 2011-539544", dated Sep. 24, 2014, 4 Pages.

"Office Action and Search Report Received for Taiwan Patent Application No. 98140854", dated Sep. 18, 2014, 7 Pages.

"Office Action Issued in Japanese Patent Application No. 2015-009333", dated Dec. 3, 2015, 7 Pages.

Iwabuchi, Yukihiro, "Software~Iron Translator~ASCII", In PC USER, Softbank Publishing Co. Ltd., vol. 7, Issue 13, Aug. 8, 2000, 4 Pages.

"Office Action Issued in Korean Patent Application No. 10-2011-7012187", dated Oct. 30, 2015, 15 Pages.

"Office Action Issued in Korean Patent Application No. 10-2011-7012187", dated May 31, 2016, 5 Pages.

* cited by examiner

VIEWING MESSAGES AND MESSAGE ATTACHMENTS IN DIFFERENT LANGUAGES

BACKGROUND

The Internet has made possible the exchange of information between entities all over the world. This has been a significant benefit to the internationalization of companies; however, this also introduces interesting problems in terms of communications and understanding the communications. Even in the general public arena, direct contact between users is now possible from virtually anywhere, but language barriers can still be problematic.

In one particular example, the multi-language problem occurs in the Chinese language. There are two Chinese languages: Simplified Chinese and Traditional Chinese. The Simplified Chinese language uses characters having a reduced number of strokes as well as entirely different terms; however, this simplification, while providing improvements in some respects, exacerbates recognition of characters in other respects.

Most Chinese users are familiar with just one of the languages. As the business in the Greater China Region grows, Chinese users are receiving more attachments to messages in other Chinese languages. For instance, users in Taiwan and Hong Kong, who are familiar with Traditional Chinese, may receive more attachments, emails, and other types of message from co-workers, partners, and customers in mainland China, in Simplified Chinese. Conversely, the same is occurring where the Simplified Chinese users in mainland China are getting more Traditional Chinese emails/attachments from Taiwan and Hong Kong. The ubiquitous nature of the Internet is placing additional demands on software vendors to develop ways in which users can quickly perceive documents in different languages.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates language conversion and viewing of a message attachment in multiple different languages. The architecture can be employed in a messaging application or a personal information manager program, for example, such that the message attachment can be selected and designated for conversion into a different language, and then previewed in the different language.

For example, a first language can be simplified Chinese and a second language can be traditional Chinese, such that the user can toggle the preview to view the attachment in the simplified or traditional Chinese languages.

The attachment can be a word processing document, a spreadsheet document, or a presentation document for the presentation of information. The message itself can be email, or a web feed document (e.g., RSS-really simple syndication format, for example. Additionally, the attachment can be one of multiple attachments to the message that is selected by the user.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
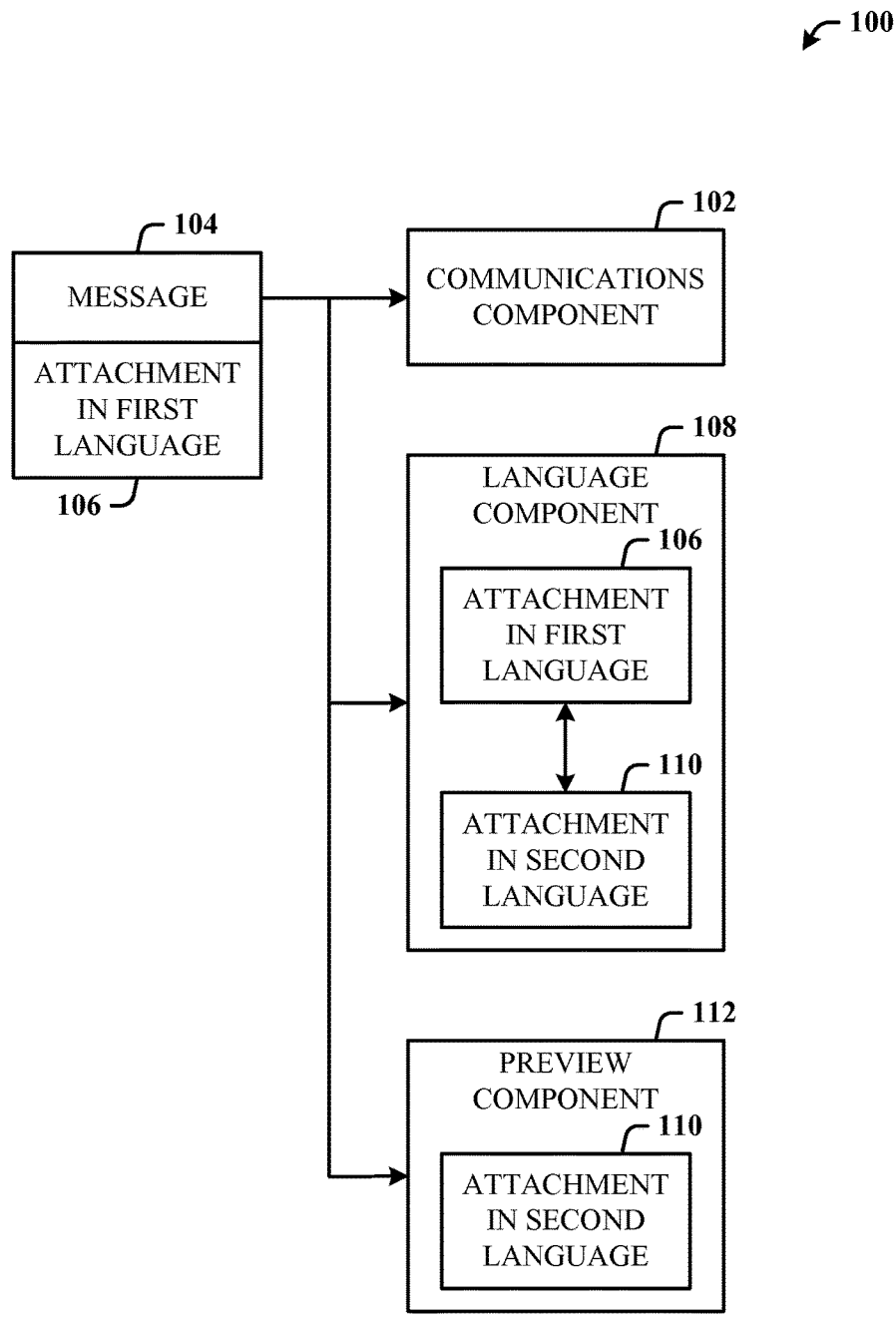
FIG. 1 illustrates a computer-implemented language conversion and viewing system in accordance with the disclosed architecture.

Typically, users read email more than writing. This practice occurs with other communications sources, as well, such as viewing of web feed data (e.g., RSS (really simple syndication) format articles). Given the globalization of communications, the disclosed architecture provides for quick conversion between multiple different languages for email, email attachments, and web feeds. For example, in the context of simplified and traditional Chinese languages, users can view an email in the other Chinese language, preview an email in the other Chinese language, view a web feed item in the other Chinese language, preview a web feed item in the other Chinese language, preview a word processor document attachment in the other Chinese language, preview a presentation attachment of a presentation program (e.g., PowerPoint™ by Microsoft Corporation) in the other Chinese language, and preview a spreadsheet attachment in the other Chinese language, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented language conversion and viewing system 100 in accordance with the disclosed architecture. The system 100 can include a communications component 102 for receiving a message 104, and an attachment 106 to the message 104. The message can be a web feed document (e.g., RSS—really simple syndication format, rich site summary format, and/or RDF (resource description framework) site summary format). The attachment 106 can be in a first language. The attachment 106 can be in the same language as the content in the email or a language different than the content. The communications component 102 can be an email program or a more robust program such as a personal information manager that also provides email functionality (e.g., Outlook™ by Microsoft Corporation).

The system 100 can also include a language component 108 for converting the attachment 106 between (that is, back and forth) the first language and a second language (the attachment 110 in the second language), and a preview component 112 for previewing the attachment 110 in the second language. For example, the first language can be simplified Chinese and the second language can be traditional Chinese. Alternatively, the first language can be traditional Chinese and the second language can be simplified Chinese. Conversion can be between languages other than Chinese, as well, such as Chinese and English, Russian and English, etc., using language models and architectures that provide such translation (conversion) capabilities. The conversion is performed on the text and other convertible content in the attachment (106 and 110).

The attachment (106 or 110) can be a word processing document, spreadsheet document, or a presentation document for the presentation of information. Additionally, the attachment 106 can be one of multiple attachments to the message that is selected by the user. The process of selecting can include a one-click process where the attachment is selected and previewed via an editor of the message program, and a double-click process where the attachment is opened outside the message program editor using a program in which the attachment was originally created, for example.

The communications component 102, language component 108, and preview component 112 can be part of a client application (e.g., an email program, personal information management program, etc.) that receives and processes messages (e.g., message 104, email, RSS content, etc.) and message attachments (e.g., attachment 106).

Figure 2:
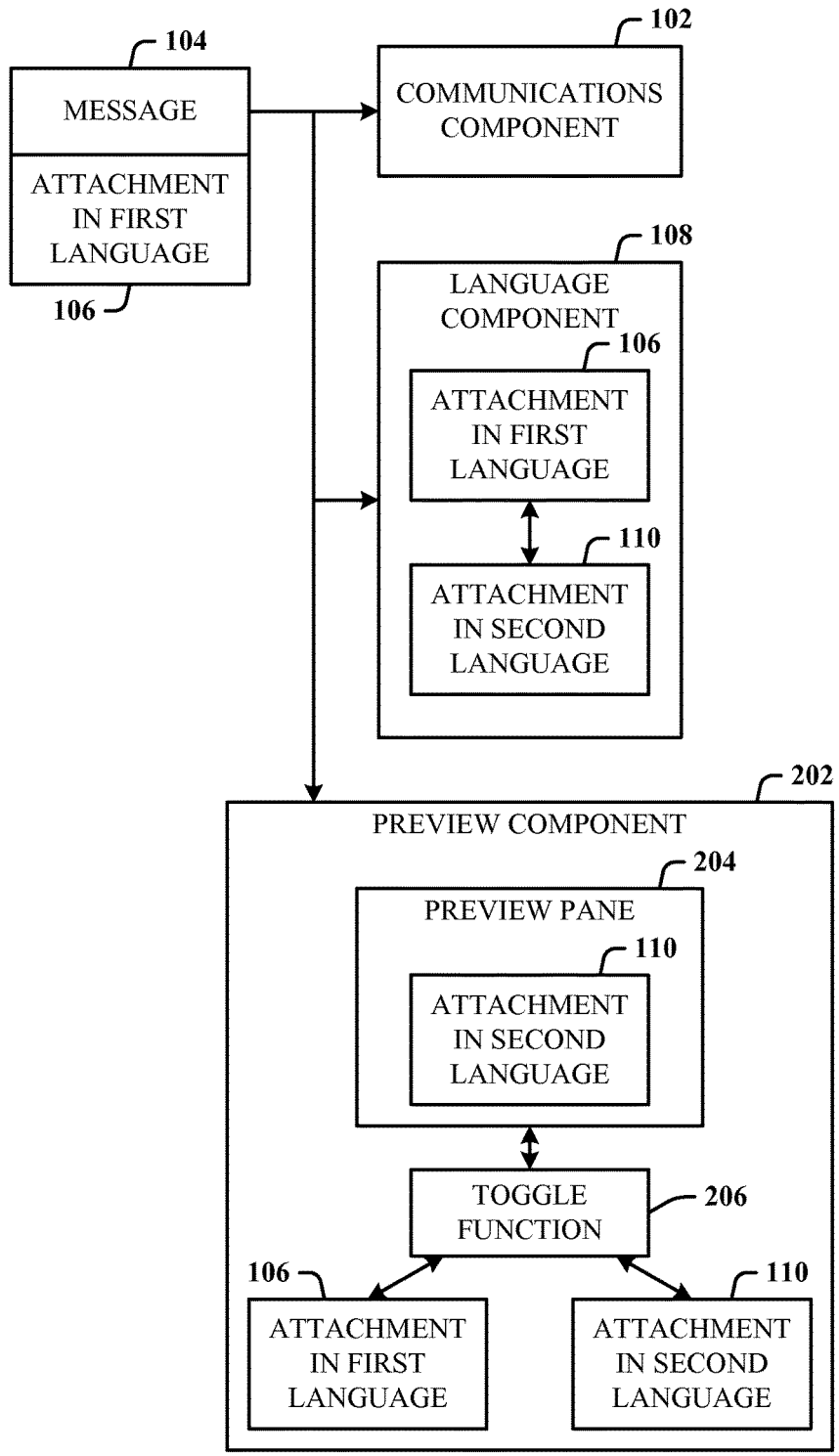
FIG. 2 illustrates an alternative language conversion and viewing system.

FIG. 2 illustrates an alternative language conversion and viewing system 200. The system 200 includes the communications component 102 for receiving the message 104, and the attachment 106 to the message 104 in the first language, the language component 108 for converting the attachment 106 between the first language and the attachment 110 in the second language, and the preview component 202 for previewing the attachment 110 in the second language.

Here, a preview component 202 includes a preview pane 204 in which a selected attachment such as the attachment 110 in the second language is presented for preview (preview occurs via the messaging application and is the state other than full presentation in the application in which the attachment was created). The preview component 202 is depicted as further including a toggle function 206 that facilitates changing the preview in the preview pane 204 by switching the view between the attachments (106 and 110). In other words, the preview component 202 includes the toggle function 206 for toggling between a preview of the attachment 106 in the first language and a preview of the attachment 110 in the second language. The toggling function is intended to include the ability to switch or navigate over many preview panes and/or attachments.

The communications component 102, language component 108, and preview component 202 can be part of a client application (e.g., an email program, personal information management program, etc.) that receives and processes messages (e.g., message 104, email, RSS content, etc.) and message attachments (e.g., attachment 106).

Figure 3:
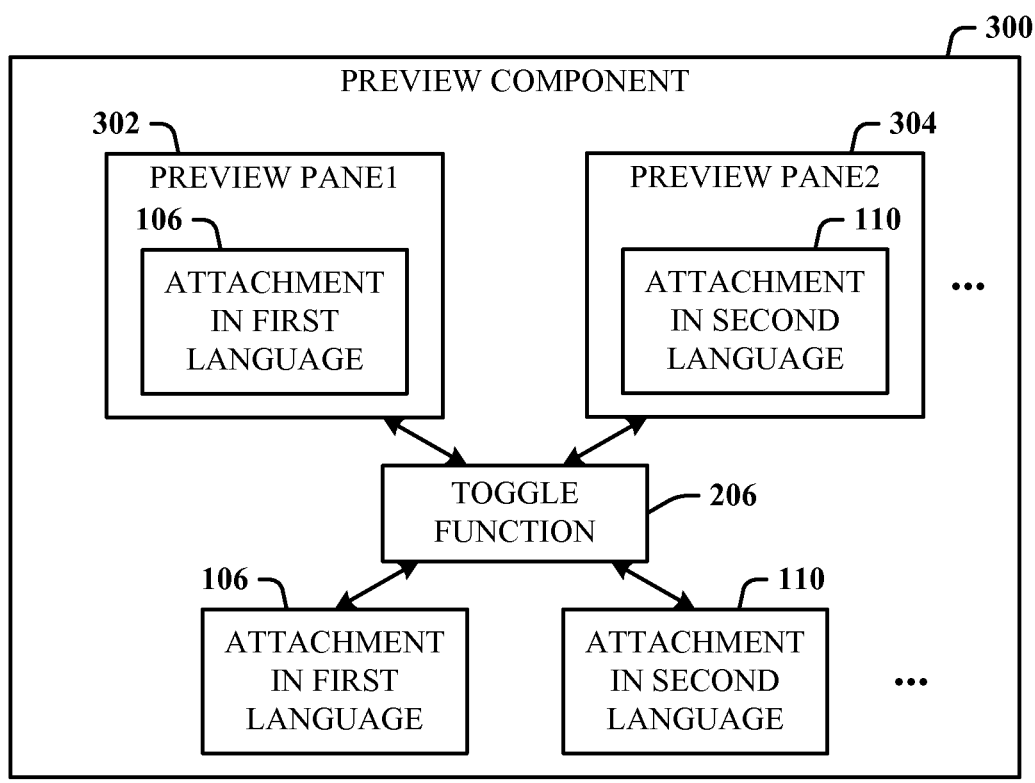
FIG. 3 illustrates an alternative embodiment of a preview component.

FIG. 3 illustrates an alternative embodiment of a preview component 300. Here, the preview component 300 concurrently presents the attachments (106 and 110) using a first preview pane 302 (Preview Pane1) for presenting the attachment 106 in the first language and a second preview pane 304 (Preview Pane2) for presenting the attachment 110 in the second language. The toggle function 206 provides navigation between the concurrently previewed attachments (106 and 110). Note that additional preview panes can be provided for additional attachments whereby the toggle function 206 allows further navigation between all viewable preview panes. The preview panes (302 and 304) can be presented in a split-screen presentation side-by-side or top-and-bottom, for example, as well in a layered presentation where the preview panes (302 and 304) are layered from foreground to background. In other words, the attachment can be previewed in both the first language and the second language. It is also within contemplation that the attachments (106 and 110) can be presented concurrently in a single preview pane but using a split-view or layered presentation.

The preview component 300 can be part of a client application (e.g., an email program, personal information manager (PIM) program, etc.) that receives and processes messages (e.g., message 104 of FIG. 1, which can be email, RSS content, etc.) and message attachments (e.g., attachment 106).

Figure 4:
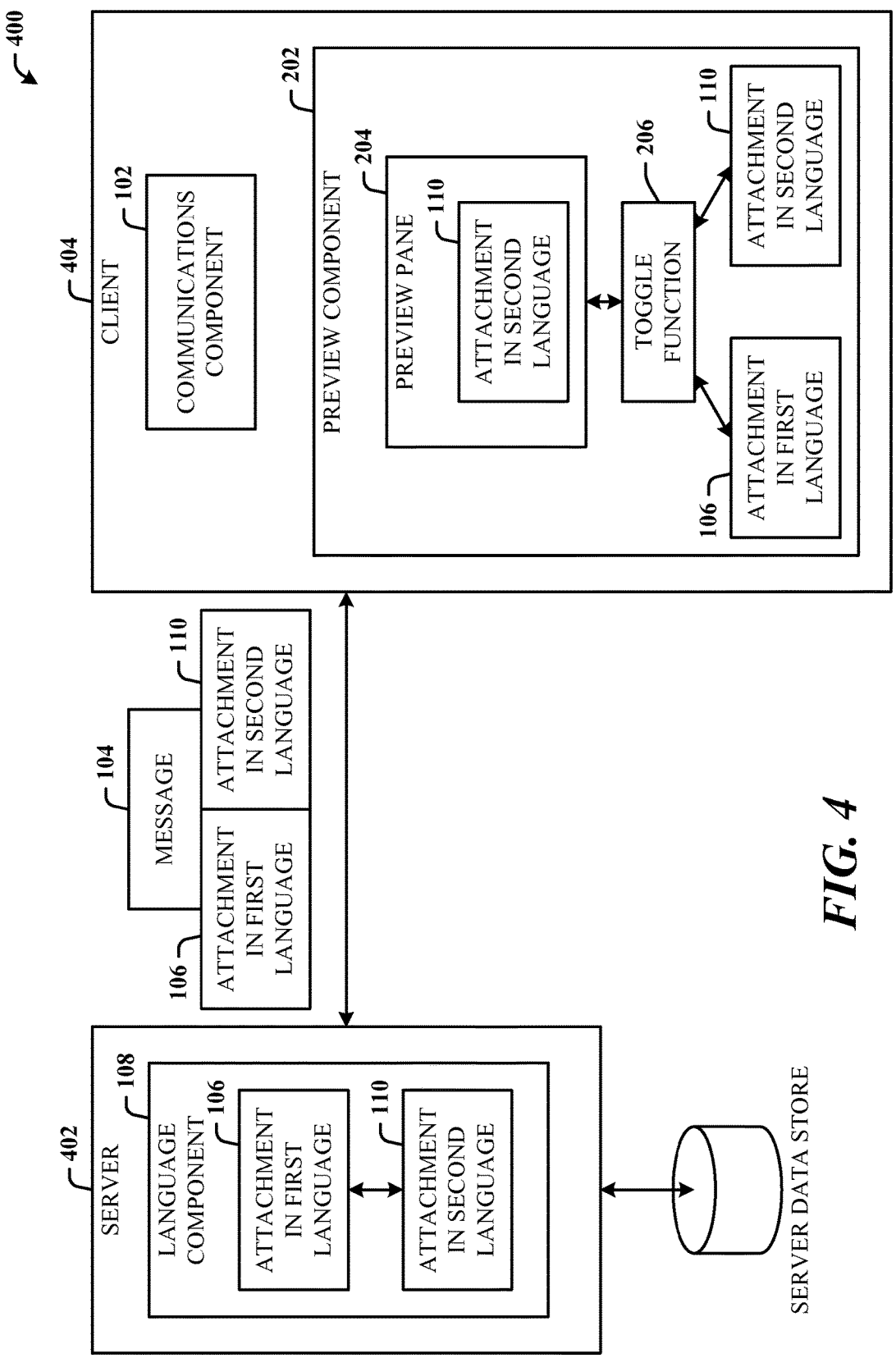
FIG. 4 illustrates an alternative implementation for language conversion and viewing in a client/server environment.

FIG. 4 illustrates an alternative implementation for language conversion and viewing in a client/server environment 400. It is common to find client devices such as handheld computing devices that lack sufficient software and/or hardware capabilities to perform all of the disclosed capabilities on the handheld device. In such an instance, the environment 400 serves to share the capabilities so that such devices can still benefit from conversion and the preview of attachments in multiple languages. Here, a server 402 (e.g., mail, MMS (multimedia messaging service, etc.)) that communicates messages and message attachments includes at least the language component 108 for converting the attachment 106 of the first language into the attachment 110 of the second language, and vice versa, for a client 404.

The converted attachment 110 in the second language and the attachment 106 in the first language are then passed to the client 404 of a device that lacks sufficient software and/or hardware capabilities to perform as described above in previous embodiments, for preview and presentation using the preview component 202. As before, the preview component 202 presents either of the attachments (106 or 110) in the preview pane 204 based on toggling using the toggle function 206. The client 404 does not need to go back to the server 402 for additional conversion since the attachments (106 and 110) are sent as a batch.

In an alternative implementation of the environment 400, the attachment 106 in the first language is communicated to the client 404 with the message 104. Thereafter, the user is presented with the option in the UI to preview the attachments in a different language. In response to selection of the option, the client 404 communicates a request to the server 402 to convert the attachment 106 in the first language into the attachment 110 in the second language. The server 402 then sends the attachment 110 to the client 404 for preview. In other words, the conversion is performed only on demand, and only by the server 402.

It is within contemplation of the subject architecture that in this environment 400, the client of the connecting device can be as the system 200 of FIG. 2 where the client includes the capability of language conversion as well. In this instance, the client does not send the conversion request to the server 402, which still has the conversion capability.

In yet another implementation of the previously described environment, the server and the client share in the conversion processing. For example, if the user chooses to preview five translations of the attachment, three conversions can be performed on the server by request of the client and the remaining two can be performed solely by the client.

Figure 5:
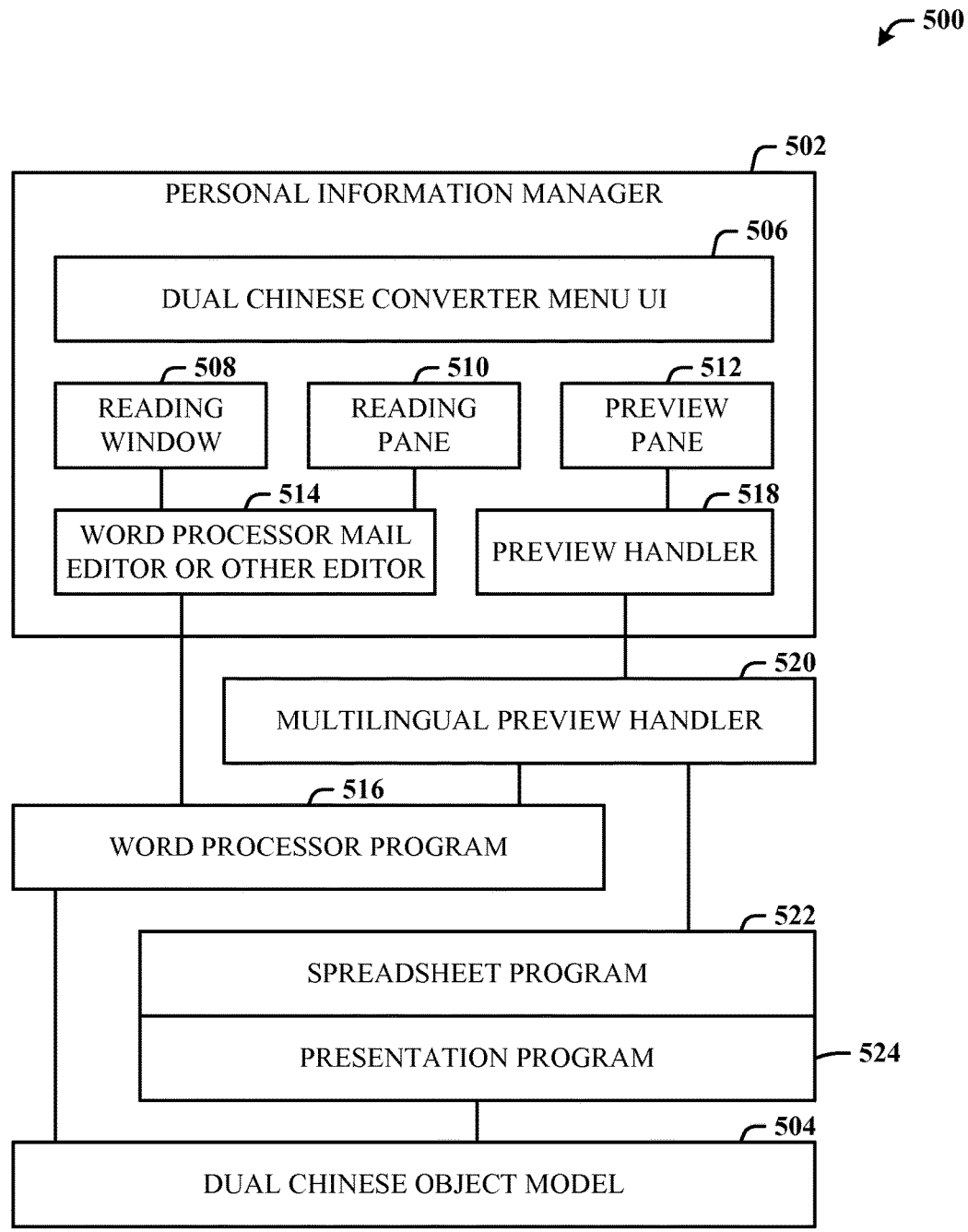
FIG. 5 illustrates a specific model for previewing attachments in a dual Chinese language implementation.

FIG. 5 illustrates a specific model 500 for previewing attachments in a dual Chinese language implementation. A personal information manager (PIM) 502 (e.g., Outlook by Microsoft Corporation) operates on top of a dual Chinese object model 504. The manager 502 includes a converter menu UI 506 that facilitates at least user interaction with the disclosed architecture in terms of navigating between panes, converting the attachments, selecting the conversion languages, number of preview panes, layout of the panes, etc.

The manager 502 can also include a reading window 508, a reading pane 510, and a preview pane 512. The reading window 508 displays a single item such as an e-mail message, task, or appointment in the manager UI. The reading pane 510 is a mechanism wherein the user can preview the contents of the message without actually opening the message. The preview pane 512 is a mechanism wherein the user can preview the contents of the attachment without actually opening the attachment.

The manager 502 also includes an editor 514 such as a word processor program 516 for editing message content or preview content, or some other editor. The manager 502 also includes a preview handler 518 for providing content for preview in the preview pane 512.

A multilingual preview handler 520 interfaces to the preview handler of the manager 502 for providing content in different languages, such as Simplified and Traditional Chinese, in this example. The word processor program 516, a spreadsheet program 522, and a presentation program 524 interface to the multilingual preview handler 520 to provide corresponding documents as attachments for conversion and preview in the preview pane 512. The word processor program 516, spreadsheet program 522, and presentation program 524 interface to the dual Chinese object model 504 for receipt of content in the different languages.

Figure 6:
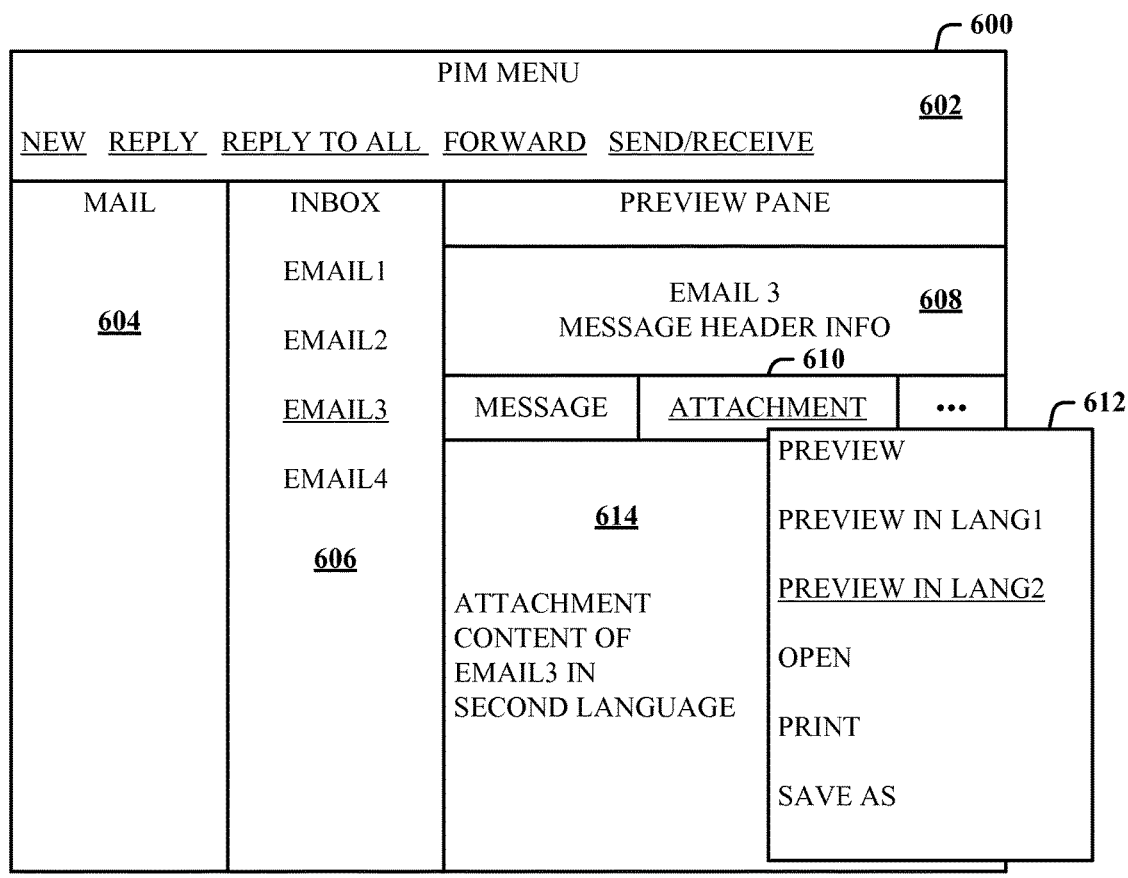
FIG. 6 illustrates an exemplary user interface for converting attachment content in a different language.

FIG. 6 illustrates an exemplary user interface 600 for converting attachment content in a different language. Here, a PIM interface 600 is presented showing a PIM menu 602 for interacting with operations provided by the PIM in processing email. A Mail section 604 can include folders for orderly storage of email messages and an Inbox section 606 can list email messages in the inbox. Here, a third email (Email3) has been selected, the third email having header information 608 and an attachment 610 (Attachment). The user can right-click, for example, to open a floating menu 612 that presents selectable options, such as an option to preview the third email in a second language (Lang2). In response, the attachment content is presented in a preview pane 614. The user can toggle between different languages listed in the floating menu 612, such as toggling back to the first language (Lang1) in which the attachment may have been originally provided. The same or similar menu 612 can be applied to the message such that the user can convert the message between languages, such as the first language and the second language.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
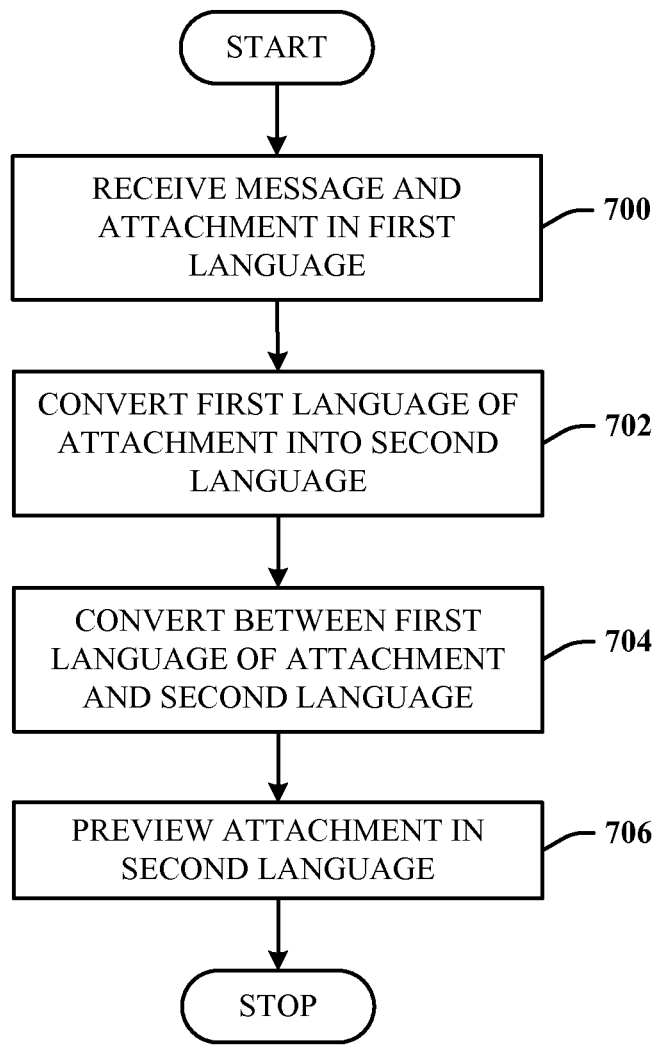
FIG. 7 illustrates a method of converting and viewing data.

FIG. 7 illustrates a method of converting and viewing data. At 700, a message and a message attachment are received. The attachment is in a first language. At 702, the attachment is converted between the first language and a second language. In other words, the attachment can be converted to the second language. In response to one selected option, the attachment can be converted back to the first language. In response to another selected option, the attachment can be converted from the second language to a third language, or back to the first language and then to the third language. At 704, the attachment is converted into the second language. At 706, the attachment in the second language is previewed.

Figure 8:
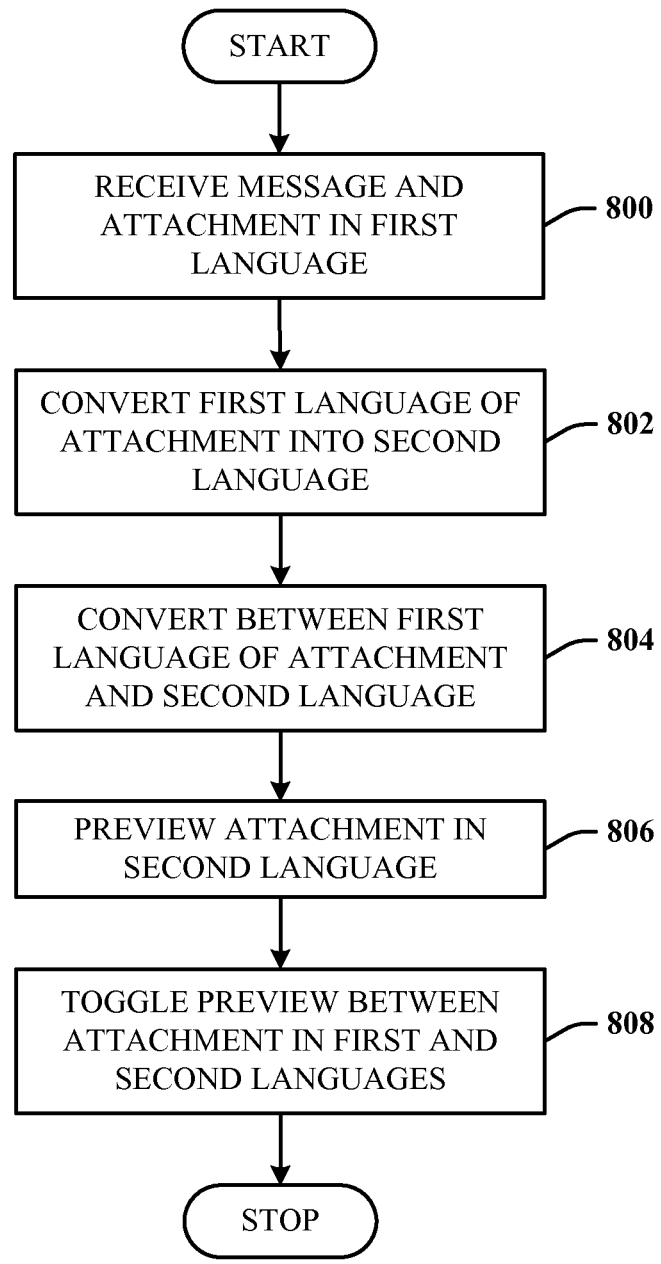
FIG. 8 illustrates a method of switching between attachment previews.

FIG. 8 illustrates a method of switching between attachment previews. At 800, a message and a message attachment are received in a first language. At 802, the attachment is converted between the first language and a second language. At 804, the attachment is converted into the second language. At 806, the attachment in the second language is previewed. At 808, the user toggles the preview between the attachment in the first language and the attachment in the second language.

Figure 9:
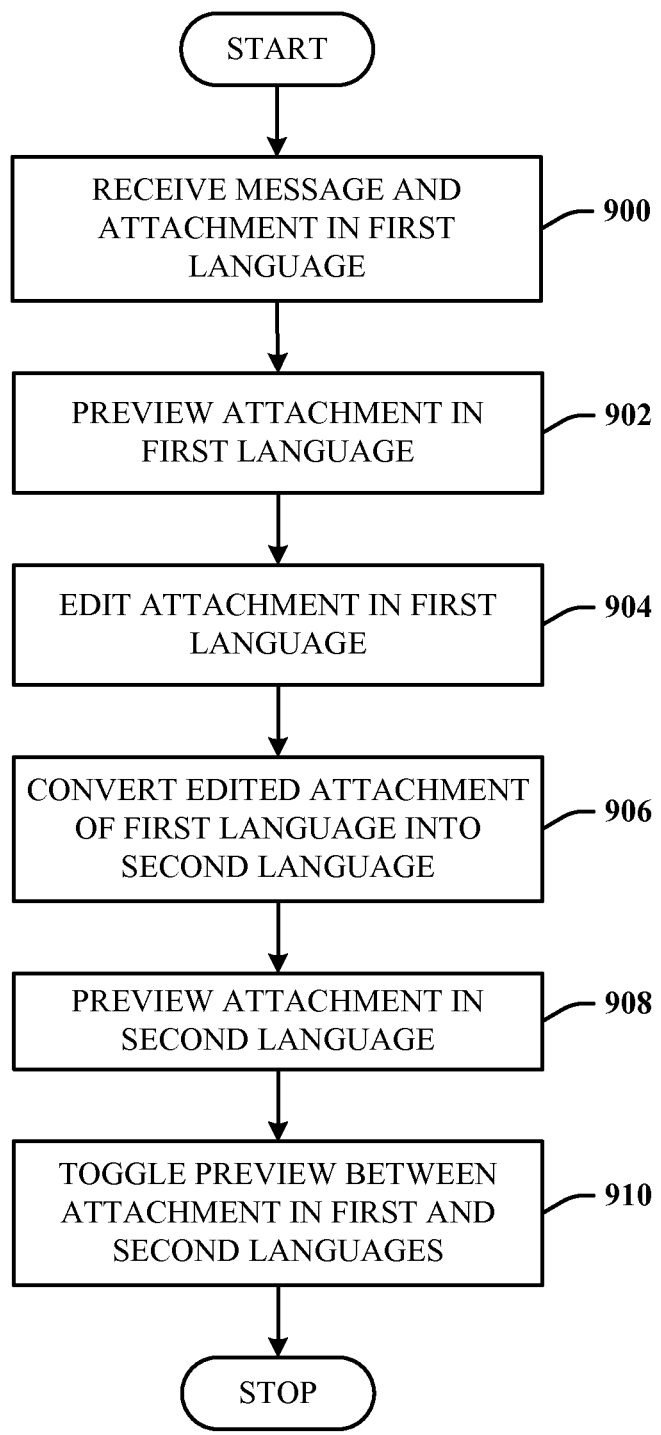
FIG. 9 illustrates a method of editing and previewing an attachment.

FIG. 9 illustrates a method of editing and previewing an attachment. At 900, a message and a message attachment are received in a first language. At 902, the attachment is previewed in the first language. At 904, the attachment is edited in the first language. At 906, the edited attachment is converted into a second language. At 908, the attachment is previewed in the second language. At 910, the preview is toggled between the attachment in the first language and the attachment in the second language.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
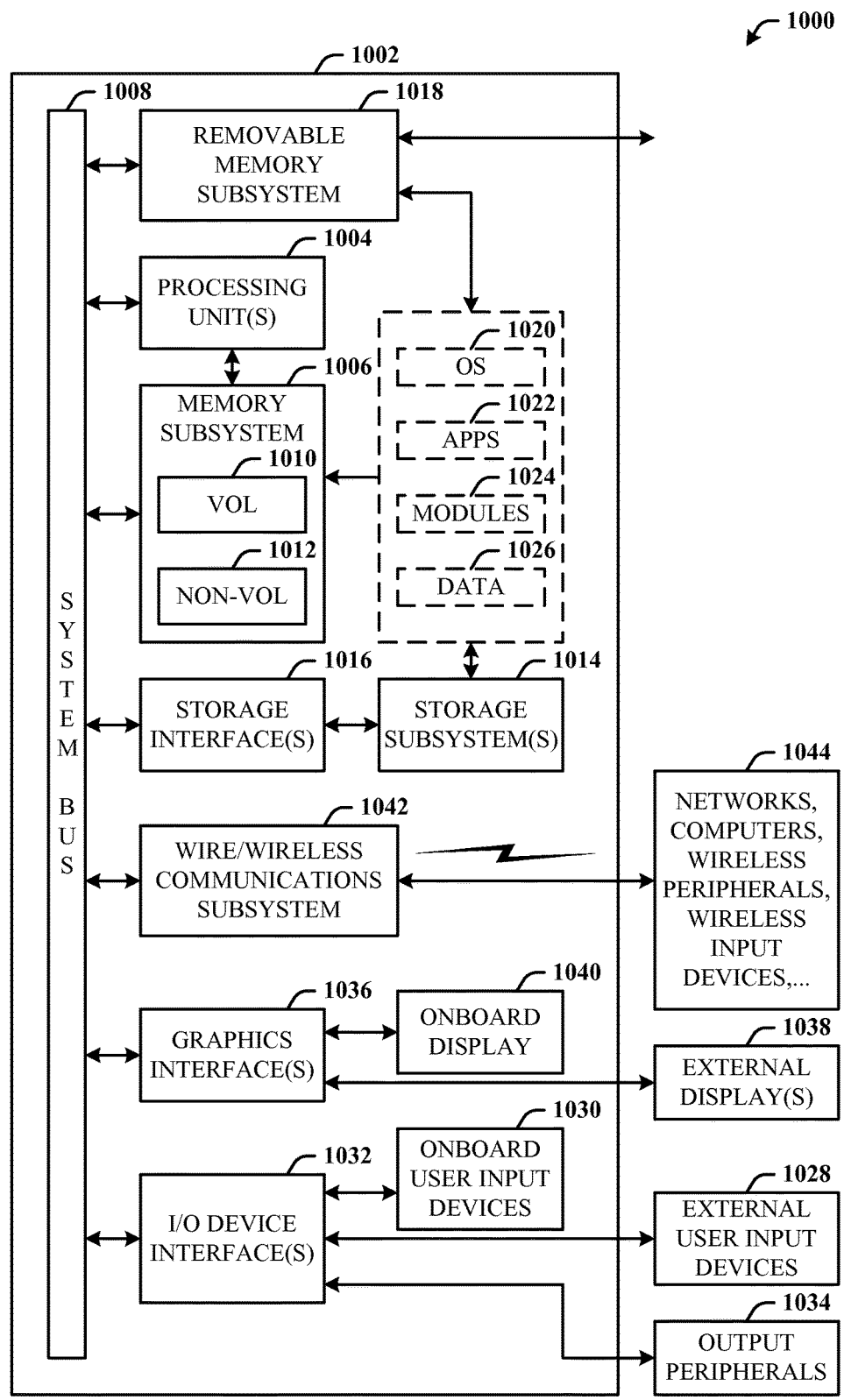
FIG. 10 illustrates a block diagram of a computing system operable to execute message and attachment previewing in accordance with the disclosed architecture.

Referring now to FIG. 10, there is illustrated a block diagram of a computing system 1000 operable to execute message and attachment previewing in accordance with the disclosed architecture. In order to provide additional context for various aspects thereof, FIG. 10 and the following discussion are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the memory subsystem 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes storage subsystem(s) 1014 and storage interface(s) 1016 for interfacing the storage subsystem(s) 1014 to the system bus 1008 and other desired computer components. The storage subsystem(s) 1014 can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a removable memory subsystem 1018 (e.g., flash drive form factor technology), and/or the storage subsystem(s) 1014, including an operating system 1020, one or more application programs 1022, other program modules 1024, and program data 1026. Generally, programs include routines, methods, data structures, other software components, etc., that perform particular tasks or implement particular abstract data types. The one or more application programs 1022, other program modules 1024, and program data 1026 can include the system 100 of FIG. 1, the system 200 of FIG. 2, the preview component 300 of FIG. 3, the client 404 of FIG. 4, the model 500 of FIG. 5, the user interface 600 of FIG. 6, and the methods of FIGS. 7-9, for example.

All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Computer readable media can be any available media that can be accessed by the computer 1002 and includes volatile and non-volatile media, removable and non-removable media. For the computer 1002, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP) using logical connections via a wire/wireless communications subsystem 1042 to one or more networks and/or other computers. The other computers can include workstations, servers, routers, personal computers, microprocessor-based entertainment appliance, a peer device or other common network node, and typically include many or all of the elements described relative to the computer 1002. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wire/wireless communication subsystem 1042 (e.g., a network interface adapter, onboard transceiver subsystem, etc.) to communicate with wire/wireless networks, wire/wireless printers, wire/wireless input devices 1044, and so on. The computer 1002 can include a modem or has other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
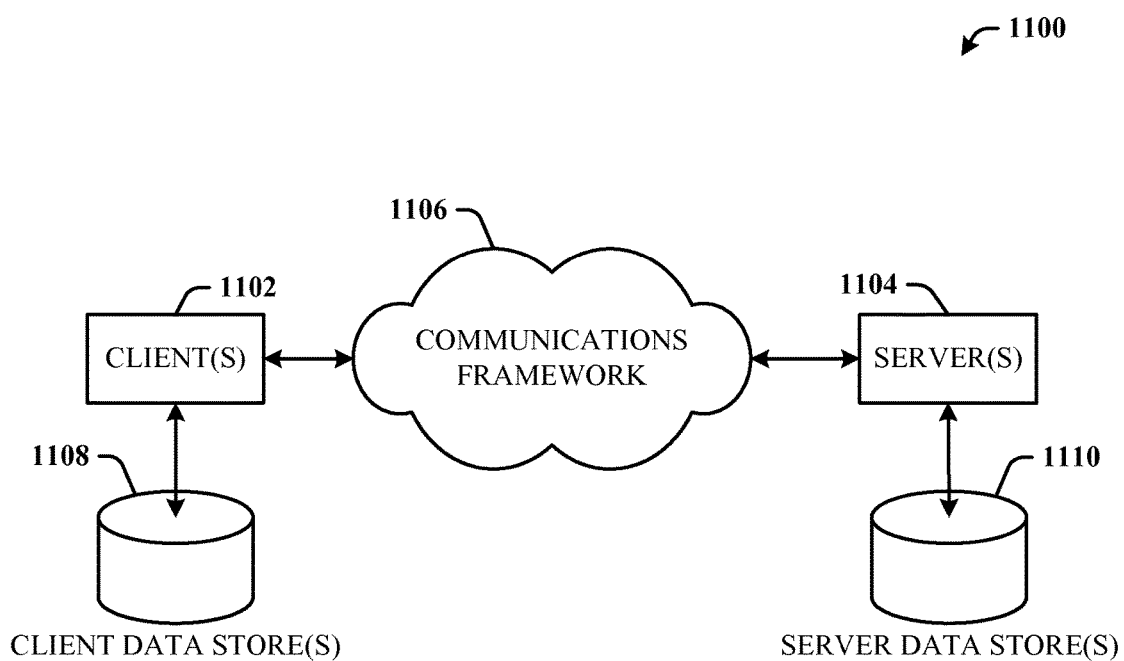
FIG. 11 illustrates a schematic block diagram of a computing environment for message and/or attachment preview and editing.

Referring now to FIG. 11, there is illustrated a schematic block diagram of a computing environment 1100 for message and/or attachment preview and editing. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

The client(s) 1102 can include the system 100 of FIG. 1, the system 200 of FIG. 2, the preview component 300 of FIG. 3, the client 404 of FIG. 4, the model 500 of FIG. 5, the user interface 600 of FIG. 6, and the server(s) 1104 can include the server 402 of FIG. 4.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented language conversion and viewing system, comprising:
   a communications component configured to receive a message, and an attachment to the message, the attachment in a first language;
   a language component configured to convert the attachment between the first language and a second language;
   a preview component configured to generate a preview pane, and to present the attachment in the second language in the preview pane; and
   a processor configured to execute computer-executable instructions associated with the communications component, the language component, and the preview component; wherein the preview component is configured with a toggle function that enables toggling, in the preview pane, between a preview of the attachment in the first language and a preview of the attachment in the second language.

2. The system of claim 1, wherein the first language is simplified Chinese and the second language is traditional Chinese.

3. The system of claim 1, wherein the attachment is a word processing document or spreadsheet document.

4. The system of claim 1, wherein the attachment is a presentation document for presentation of information.

5. The system of claim 1, wherein the message is a web feed document.

6. The system of claim 1, wherein the attachment is one of multiple attachments to the message that is selected.

7. The system of claim 1, wherein the attachment is previewed in both the first language and the second language.

8. The system of claim 1, further comprising an editor configured to enable editing at least one of message content or preview content.

9. A computer-implemented language conversion and viewing system, comprising:
- a communications component configured to receive a message, and an attachment to the message, the attachment in a first language;
- a language component configured to convert the attachment between the first language and a second language;
- a preview component configured to enable a preview pane and to preview the attachment in the second language in the preview pane;
- a toggle function configured to enable toggling, in the preview pane, between presentation of the attachment in the first language and the attachment in the second language; and
- a processor that executes computer-executable instructions associated with the communications component, the language component, the preview component, and the toggle function.

10. The system of claim 9, wherein the first language is simplified Chinese and the second language is traditional Chinese.

11. The system of claim 9, wherein the attachment is a word processing document, a spreadsheet document, a presentation document for the presentation of information, or a web feed document.

12. The system of claim 9, wherein the message is in the first language and the language component converts the message into the second language for viewing and previewing.

13. The system of claim 9, wherein the preview component is configured to generate additional preview panes for previewing respective additional attachments, wherein the toggle function enables further navigation between all viewable preview panes.

14. A computer-implemented method of converting and viewing data, comprising acts of:
- receiving a message and a message attachment, the attachment in a first language;
- converting the attachment between the first language and a second language;
- previewing the attachment in the second language in a preview pane of a messaging application;
- configuring a processor to execute instructions stored in memory, where execution of the instructions enables the acts of receiving, converting, and previewing; and
- toggling between a preview of the attachment in the first language and a preview of the attachment in the second language.

15. The method of claim 14, wherein the first language is simplified Chinese and the second language is traditional Chinese.

16. The method of claim 14, further comprising converting the message, which is in the first language, to the second language and viewing the message in the second language.

17. The method of claim 14, further comprising editing the message or the attachment in the second language.

18. The method of claim 14, wherein attachment is one of multiple attachments, the attachments in at least one of a word processing format, a spreadsheet format, or a presentation format for presentation of information.

* * * * *